No. 638,514. Patented Dec. 5, 1899.
W. P. HUNT & C. P. A. FRIBERG.
DISK HARROW.
(Application filed Feb. 13, 1899.)
(No Model.) 2 Sheets—Sheet 1.
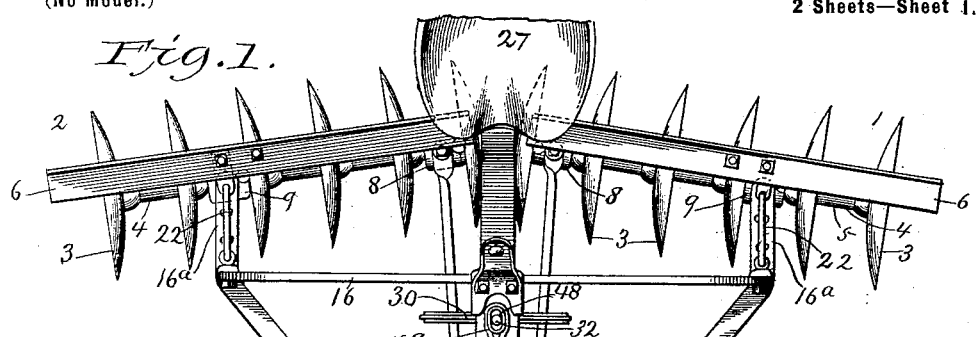
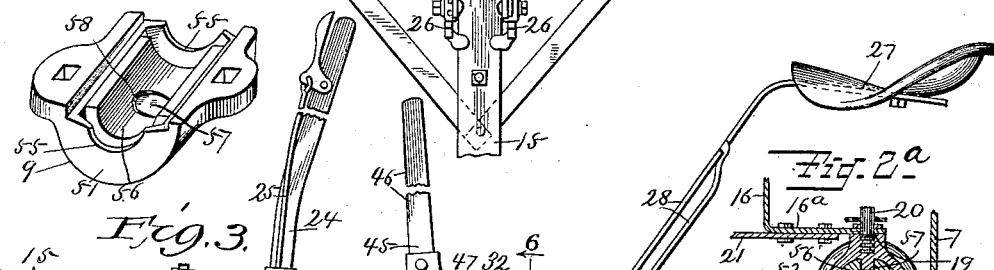
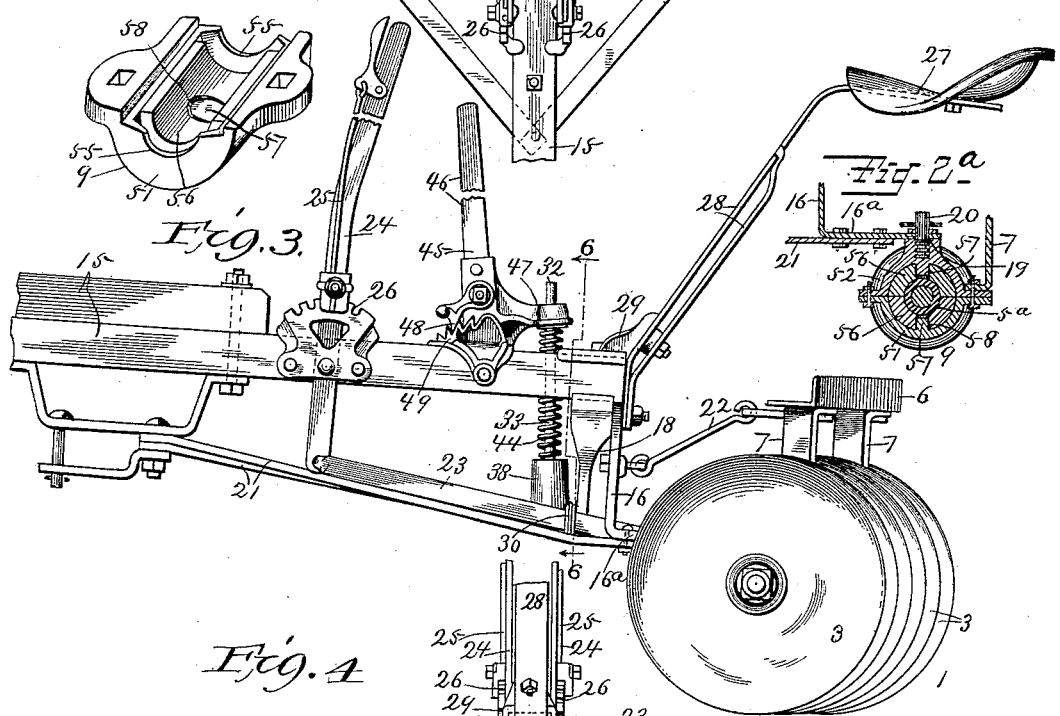
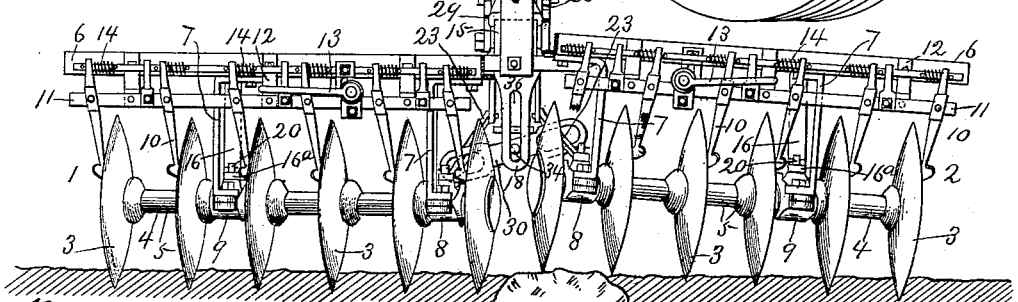
Witnesses: Inventors:
W. P. Hunt and
C. P. A. Friberg,
By W. B. Richards, Atty.

No. 638,514. Patented Dec. 5, 1899.
W. P. HUNT & C. P. A. FRIBERG.
DISK HARROW.
(Application filed Feb. 13, 1899.)
(No Model.) 2 Sheets—Sheet 2.
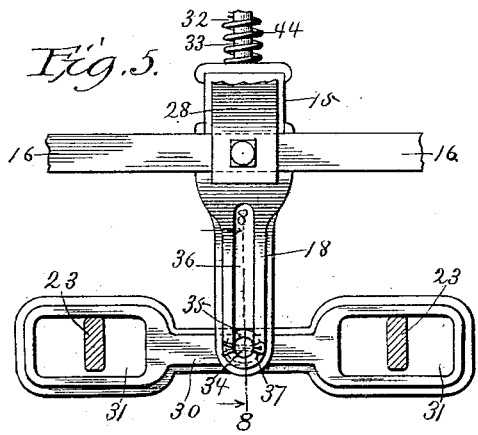
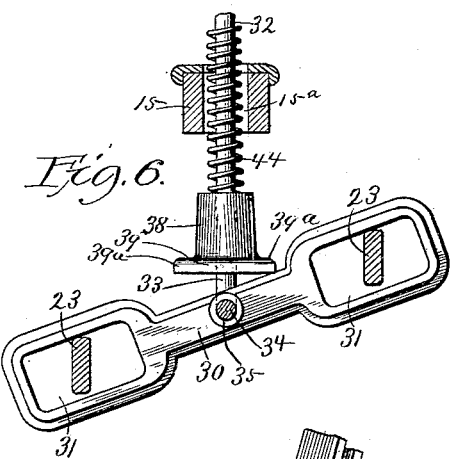
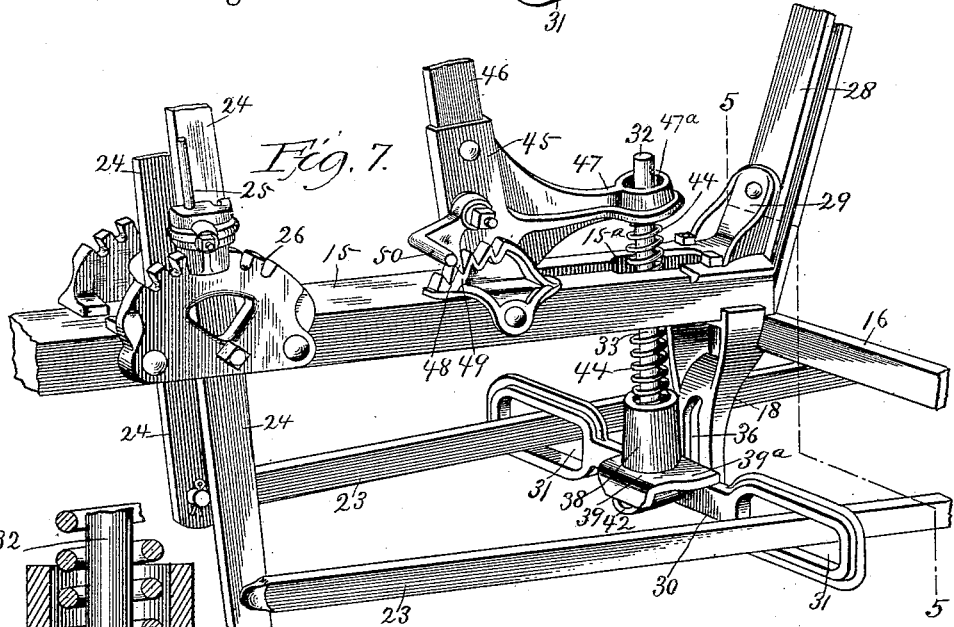
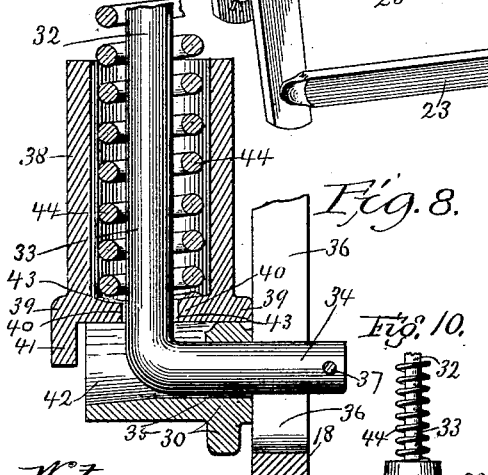
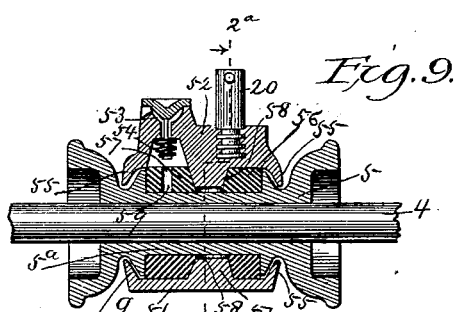

UNITED STATES PATENT OFFICE.

WILSON P. HUNT AND CHARLES P. A. FRIBERG, OF MOLINE, ILLINOIS, ASSIGNORS TO THE DEERE & MANSUR COMPANY, OF SAME PLACE.

DISK HARROW.

SPECIFICATION forming part of Letters Patent No. 638,514, dated December 5, 1899.

Application filed February 13, 1899. Serial No. 705,402. (No model.)

*To all whom it may concern:*

Be it known that we, WILSON P. HUNT and CHARLES P. A. FRIBERG, citizens of the United States, residing at Moline, in the county of Rock Island and State of Illinois, have invented a new and useful Improvement in Disk Harrows, of which the following is a specification.

The invention herein described relates in its general features to disk harrows, and pertains especially to that type of such harrows in which two gangs of disks are each pivotally connected nearest to its outer end with the frame or other part of the harrow in such manner that each gang at its inner end is free to rise as it is forced upwardly and to fall by gravity and may be adjusted at different angles to the line of draft or path of the harrow. In harrows of this type the disks are generally of concavo-convex form mounted on the axles of each gang with their concave sides toward the outer ends of said axles, and the axles are adjusted at different angles to the line of draft, so that each disk will rotate in a plane also oblique to the line of draft, and thereby cause the disks to throw the soil laterally with greater or less force, as may be required or desired in different kinds of soil. Hence the pressure of the soil against the outer sides and lower edges of the disks of each gang will exert a force tending to elevate the inner ends of each gang, which pressure will vary in harder or softer soil with different adjustments of the gangs to the line of draft and from other causes. The inner ends of the gangs being free to rise and fall, as stated, will be free to rise and fall also in passing over roots, stones, or other abnormal obstructions, and the main object of our invention is to provide certain improved and novel means by the use of which certain new modes of operation and certain new and improved results will be produced in the use of yielding spring-pressure on the inner ends of the gangs, which novel means act on the inner ends of both gangs constantly through an intermediate equalizing-bar, whereby the disk gangs will be automatically adjusted by such yielding spring-pressure on their inner ends as will cause all of the disks of each gang to penetrate the soil at substantially the same depth under all ordinary conditions, which will tend to quickly restore the gangs to their normal working positions after the inner end of either has been raised by any abnormal obstruction, and the tension of which pressure is adjustable by means of a lever, as hereinafter fully described.

To the end of carrying out the foregoing main feature of our improvement the invention consists in constructions and combinations comprising a yielding spring-pressure mechanism constructed and combined with other parts in such manner as to have a new mode of operation and to produce new and improved results, all as hereinafter fully described and made the subject-matter of claims hereto appended.

A further object of our invention is to provide improved bearings for the axles of disk-harrow gangs, which bearings will better stand the great friction to which they are subjected in disk harrows and have other advantages, all as hereinafter described, and expressed in claims hereto appended.

In the accompanying drawings our improvements are shown as constructed and embodied in the best way now known to us. Obviously, however, while still within the purview of our invention some or all of the parts may differ in their construction, in their organization, and in their disposition or arrangement for coaction from what we have shown in the accompanying drawings, in which—

Figure 1 is a top plan of our improved disk harrow, partly broken away, the scrapers and means for operating them not shown; Fig. 2, an enlarged perspective showing the lower half of one of the axle journal-boxes; Fig. 2$^a$, a transverse sectional elevation in the line 2$^a$ 2$^a$ in Fig. 9; Fig. 3, an enlarged side elevation, partly broken away, other parts removed; Fig. 4, a rear elevation, partly broken away; Fig. 5, an enlarged sectional elevation in the line 5 5 in Fig. 7; Fig. 6, an enlarged sectional elevation in the line 6 6 in Fig. 3; Fig. 7, an enlarged perspective of parts which coact and are hereinafter fully described; Fig. 8, an enlarged sectional elevation in the line 8 8 in Fig. 5; Fig. 9, an enlarged axial sectional elevation of one of the journal-boxes; Fig. 10, a side elevation of parts shown at Fig. 8 and sectional elevation of the equalizing-bar.

The disk gangs 1 2 are of ordinary construction, each gang having disks 3 of concavo-convex form mounted on an axle 4, with their concave sides toward the outer end of each gang and properly adjusted by spool-shaped spacing-thimbles 5, which rotate with the disks and axle 4. Each disk gang supports the usual beam 6 by standards 7, which are bolted to said beams and to the axle journal-boxes 8 and 9. The beams 6 shown are of angle-iron, but may be of any preferred material. At Fig. 4 ordinary scrapers 10 are shown, supported on a scraper-bar 11, which is supported on hangers 12, pendent from the beams 6. Each gang of scrapers is operated, as usual, by a foot-lever 13, and each scraper is independently actuated by a spring 14, as usual. The journal-boxes 8 are near the inner ends of each disk gang, as shown, between the first and second disks therefrom, and the journal-boxes 9 are near the outer ends of said disk gangs, as shown, between the second and third disks or between the outer third and second third of the length of the disk gang. These distances, however, may vary without affecting the operation of our improvements. The harrow-frame is also of ordinary construction and comprises a guide pole or tongue 15, an arched bar 16, having horizontal end parts 16$^a$, and draft-bars 21. The arched bar 16 may be fixed at its mid-length to the rear end of the tongue 15 or, as shown, to a hanger 18, which is bolted to the rear end of said tongue and is hereinafter described. The horizontal end parts 16$^a$ of the arched bar 16 extend rearwardly and each has a through-hole 19, which seats loosely over that one of the stud-pins 20 which projects upwardly from the journal-box 9 of the disk-gang at its side of the machine. The main draft-bars 21, forming part of the main frame, are connected at their forward ends with the doubletree-attaching iron or may be connected directly to the draft-pole, and their rear ends (see Fig. 2$^a$) are bolted to the horizontal ends 16$^a$ of the arched bar 16, thus connecting them one with each of the disk gangs, and the journal-boxes 9 thus become substantially the pivotal points on which the disk gangs rise and fall at their inner ends and on which they swing for adjustments to the line of draft. The upper part or beam 6 of each gang is connected by a link 22 with the adjacent side of the arch 16, thus holding the standards 7 in upright positions and the journal-boxes 8 and 9 also in upright working positions, as the lower ends of said standards are connected with said journal-boxes.

Ordinary disk-gang-adjusting bars 23 are pivotally connected at their rear ends one with each of the journal-bearings 8 and are pivotally connected at their forward ends one with the lower end of each of the hand-levers 24. Said hand-levers are pivoted one on each side of the draft-pole and are provided with locking-pawls 25, which engage with curved rack-bars 26. By adjustments of said hand-levers the disk gangs may be independently adjusted at different angles to the line of travel of the harrow in an ordinary manner. The gang-adjusting bars 23 also serve to a limited extent as draft-bars. A single lever may be used instead of the levers 24 by attaching both bars 23 thereto in an ordinary manner; but the gangs cannot be independently adjusted by such single lever. A driver's seat 27 is supported on the draft-pole by spring-bars 28 and an angle-block 29.

30 is a spring-pressure equalizing-bar having a slot 31 in each end thereof. The disk-gang-adjusting bars 23 pass one through each of said slots 31, as best shown at Figs. 5 to 7.

32 is an elbow-shaped rod having an upright part 33 and a horizontal part 34. The horizontal end part 34 of said rod projects rearwardly through a perforation 35 in the longitudinal central part of the bar 30 and thence through a vertical slot 36 in the hanger 18 and is held from withdrawal therefrom by a split key 37, while free to slide up and down in said slot, and thus retain the equalizer-bar 30 in position against said hanger, while permitting it to slide up and down thereagainst and to oscillate on the end part 34 of the rod 32, as indicated best at Fig. 6. The upright part 33 of the rod 32 extends upwardly through a vertical slot 15$^a$ in the rear end part of the guide-pole 15, as shown best at Figs. 3 and 7.

A sleeve 38 rests on the mid-length part of the equalizer-bar 30 and has a flange or base 39 integral therewith and extending outwardly therefrom. This flange or base 39 is widest laterally of the machine and in that direction forms a foot-bar 39$^a$ at and projecting laterally from each side of said sleeve, as shown best at Figs. 6 and 7. An annulus-shaped flange 40 extends inwardly from the lower end of the sleeve 38. The foot-bars 39$^a$ rest either simultaneously or alternately on the equalizer-bar 30, as hereinafter described. The lower end part of the sleeve 38 or the flange below it is flat at its rear side, where it comes in contact with the hanger 18, (see Fig. 7,) for the purpose of preventing the sleeve from turning on its axis and has a downturned flange 41 at its front side, which will come in contact for the same purpose with a semicircular forward projection 42 from the equalizing-bar 30.

The upright part of the rod 32 is seated loosely in the opening 43 (see Fig. 8) in the inner flange 40, and the helical or spirally-coiled spring 44, the lower end of which rests on the inwardly-projecting flange 40, encircles the upright part of the rod 32 and extends through the slot 15$^a$ in the guide-pole and above said guide-pole, as shown best at Figs. 3 and 7. As shown, the lower part of the spring 44 is within the sleeve 38. If preferred, however, it may be placed outside of or exterior to said sleeve. The sleeve 38 is mainly a means for holding the flanges at its lower end, and especially the foot-bars 39ª, firmly in horizontal positions during all of the operations of the machine.

45 is an elbow-shaped hand-lever pivoted at its lower end in a forward extension of the slot 15ª. The upper end 46 of said lever is within easy reach of the driver from his seat 27, and its projecting foot 47 has a vertical perforation 47ª, through which the upper end of the rod 32 passes, so that the outer end of the foot 47 may come in contact with the upper end of the spiral spring 44. A pawl 48, pivoted to the lever 45, engages with the ratchet-teeth of a segment ratchet-bar 49 and a short arm 50 projects outwardly from the pawl 48, where it may be pressed upwardly by the driver with his foot to release the pawl 48 from the ratchet-teeth. By adjustments of the lever 45 rearwardly at its upper end the pressure of the lever-foot 47 can be increased on the spring 44, and thus increase the tension of said spring and correspondingly increase its pressure on the equalizer-bar 30 and through said equalizer-bar and the bars 23 increase the spring-pressure on the inner ends of the disk gangs. By adjustments of the upper end of said lever forwardly the pressure of the lever-foot 47 on the spring will be diminished with a reverse effect on the spring and on the disk gangs from that produced by adjustments of the lever 45 rearwardly.

The downward thrust of the spring 44 will force the ends of the equalizing-bars 30 downwardly upon the bars 23, and thus exert a constant yielding force downwardly on the inner ends of the disk gangs, and the extent of this force can be varied by the driver while in his seat 27 by means of the lever 45, as hereinbefore described. This pressure of the spring will under normal conditions act equally on both disk gangs, except when the inner end of one gang is raised, as shown at Fig. 4, by some abnormal obstruction, in which case that foot 39ª which is at the same side of the machine as the disk gang elevated at its inner end will, as shown at Fig. 6, be brought into contact with the equalizer-bar at some distance from its center at the end 34 of rod 32, and the other foot 39ª will be free from the equalizing-bar. By this means a greater part of the spring-pressure will bear upon the abnormally-elevated disk gang; but at the same time pressure will also be exerted on the other disk gang to retain it in working position, as it will be evident from an inspection of Fig. 6 that the equalizer-bar not being supported by the machine, except on the bars 23, will be forced by the tension of the spring downwardly at both of its ends, but with a force at each end of said bar depending on its distance from the flange 39ª, which is in contact with said equalizing-bar. For the same reason the spring will offer much more resistance to the inner end of either disk gang rising than would be the case if the spring alone came in contact with the longitudinal central part of the equalizer-bar or than is the case in any disk harrow of which we have any knowledge. For the same reason also either disk gang will after rising at its inner end be more quickly restored by the spring to its normal working position.

The spring-pressure on the inner rising ends of the disk gangs of ordinary spring-pressure disk harrows is increased slightly by the compression of the spring. The compression of our spring acts in same manner to increase the pressure on the rising inner end of either disk gang, while it (the pressure on the rising end of a disk gang) is also greatly increased by the automatic action of the foot-plates 39ª on the equalizing-bar. By these means the efficiency of our harrow is greatly increased over any others with which we are acquainted in leveling ridges, filling in dead furrows, passing over abnormal obstructions, overlapping prior path of the machine by a succeeding path, and in other ways.

The single spring, located centrally of the machine, as described, and combined with other parts, as shown and described, thus becomes a new and novel means of accomplishing new results and better results than have heretofore been accomplished by spring-pressure on the free ends of the disk gangs of harrows.

During aforesaid operations of the spring and sleeve 38 with its flanges the lower horizontal end 34 of the rod 32 will slide freely up and down in the slot 36 in the hanger 18 as a guide, which permits the equalizer-bar to rise and fall, while at the same time alining its movements by preventing any movement laterally of the machine.

The slotted ends of the equalizer-bar, through which slots the bars 23 pass, also provide means for the free oscillation or rocking movement of the equalizing-bar without interference therewith of said bars 23.

The journal-boxes 8 and 9 are the same in construction. Each is formed of a lower part 51 and an upper part or cap 52, bolted to each other, as shown at Fig. 2ª. The cap 52 has an oil-hole 53, which is normally closed by a spring 54. (See Fig. 9.) The parts 51 and 52 each have inwardly-projecting flanges 55, which seat over annulus-shaped flanges on the spacing-thimble 5 and form dust-guards. Similar wood linings 56, of a semicircular form, as shown at Fig. 2, are seated in each half-box 51 and 52 and are held in place against rotation by a stud 57, which projects from each half-box through a hole 58 in the lining 56, which is seated therein. By the same means the wood linings prevent endwise movement of the journal-boxes. The upper lining has a hole 59, through which the lubricant feeds to the journal 5ª, formed by the central part of the spacing-thimble 5. The wood linings, prepared before use by soaking or boiling them in oil, will wear many times longer than metal bearings, a very important feature in disk harrows, as such use soon wears out metal bearings.

What we claim as new, and desire to secure by Letters Patent, is—

1. In a disk harrow, and in combination, two pivotally-mounted disk gangs, adjusting-bars connected with the inner end parts of said disk gangs, an equalizing-bar loosely connected with said adjusting-bars, and a spring which presses downwardly on said equalizing-bar, substantially as described.

2. In a disk harrow, and in combination, two pivotally-mounted disk gangs, adjusting-bars connected with the inner end parts of said disk gangs, an equalizing-bar loosely connected with said adjusting-bars, a spring which presses downwardly on said equalizing-bar, a slotted hanger, and an elbow-shaped rod, the upright part of which is encircled by said spring, and the horizontal part of which passes through the slot in said hanger, substantially as described.

3. In a disk harrow, and in combination, two pivotally-mounted disk gangs, adjusting-bars connected with the inner end parts of said disk gangs, an equalizing-bar loosely connected with said adjusting-bars, a sleeve having an inwardly-projecting flange at its lower end, an elbow-shaped rod, a spring encircling the upright part of said rod and resting at its lower end on the flange at the lower end of said sleeve, means for alining the movements of said rod, spring and sleeve, and means for retaining the spring in a compressed state, or under tension, substantially as described.

4. In a disk harrow, and in combination, two pivotally-mounted disk gangs, adjusting-bars connected with the inner end parts of said disk gangs, an equalizing-bar loosely connected with said adjusting-bars, a sleeve having laterally-projecting flanges at its lower end and resting on the equalizing-bar, an elbow-shaped rod, a spring encircling the upright part of said rod and supported by the lower end of said sleeve, means for alining the movements of said rod, spring and sleeve, and a lever by adjustments of which the tension of the spring may be adjusted to increase or diminish the spring-pressure on the inner ends of the disk gangs, substantially as described.

5. In a disk harrow, and in combination, two pivotally-mounted disk gangs, adjusting-bars connected with the inner end parts of said disk gangs, an equalizing-bar loosely connected with said adjusting-bars, a sleeve having laterally-projecting flanges at its lower end and resting on the equalizing-bar, an elbow-shaped rod, a pendant fixed to the machine-frame and provided with a vertical slot through which the lower end of said rod passes, a spring supported at the lower end of said sleeve, and an elbow-shaped locking-lever, the foot of which rests on the upper end of said spring, whereby the tension of said spring can be adjusted, substantially as described.

6. In a disk harrow, a combination comprising disk gangs pivotally mounted, adjusting-bars connected with the inner end parts of said disk gangs, an equalizing-bar with slotted ends through which said adjusting-bars pass, a sleeve having laterally-projecting flanges at its lower end, an elbow-shaped rod, a slotted hanger, a spiral spring, and an elbow-shaped locking-lever for adjusting the tension of said spring, substantially as described.

7. In a disk harrow, a combination comprising two pivotally-mounted disk gangs, bars connected at their rear ends with the inner ends of said disk gangs, and at their forward ends with the main frame of the harrow, an equalizing-bar loosely connected with said bars, a spring which presses downwardly on said equalizing-bar, a sleeve which comes in contact with said equalizing-bar and has lateral projections, as 39$^a$, at its lower end, a bent rod, and means for adjusting the tension of said spring, substantially as described.

8. In a disk harrow, a combination comprising two pivotally-mounted disk gangs, bars connected at their rear ends with the inner ends of said disk gangs and at their forward ends with the main frame of the harrow, an equalizing-bar loosely connected with said bars, a sleeve having flanges 39$^a$ on its lower end, which come in contact with said equalizing-bar, a spring which acts on said sleeve, and means for adjusting the tension of said spring, substantially as described.

9. In a disk harrow, and in combination, substantially as described, two pivotally-mounted disk gangs, adjusting-bars connected with the inner end parts of the disk gangs, an equalizing-bar, and a spring which presses downwardly on said inner ends of the disk gangs.

10. In a disk harrow, and in combination, substantially as described, two pivotally-mounted disk gangs, a spring, an equalizer-bar on which said spring acts, and means interposed between said equalizer-bar and the inner ends of the disk gangs whereby the spring-pressure acts on said inner ends of the disk gangs.

In testimony whereof we affix our signatures in presence of two witnesses.

WILSON P. HUNT.
CHARLES P. A. FRIBERG.

Witnesses:
ADAMS N. WHEELOCK,
CLARENCE C. GREGORY.